March 26, 1963

P. A. KEITH 3,082,590

COTTON HARVESTER

Filed Feb. 6, 1961

Inventor
Percy A. Keith
By
Attorney

March 26, 1963
P. A. KEITH
3,082,590
COTTON HARVESTER
Filed Feb. 6, 1961
3 Sheets-Sheet 2
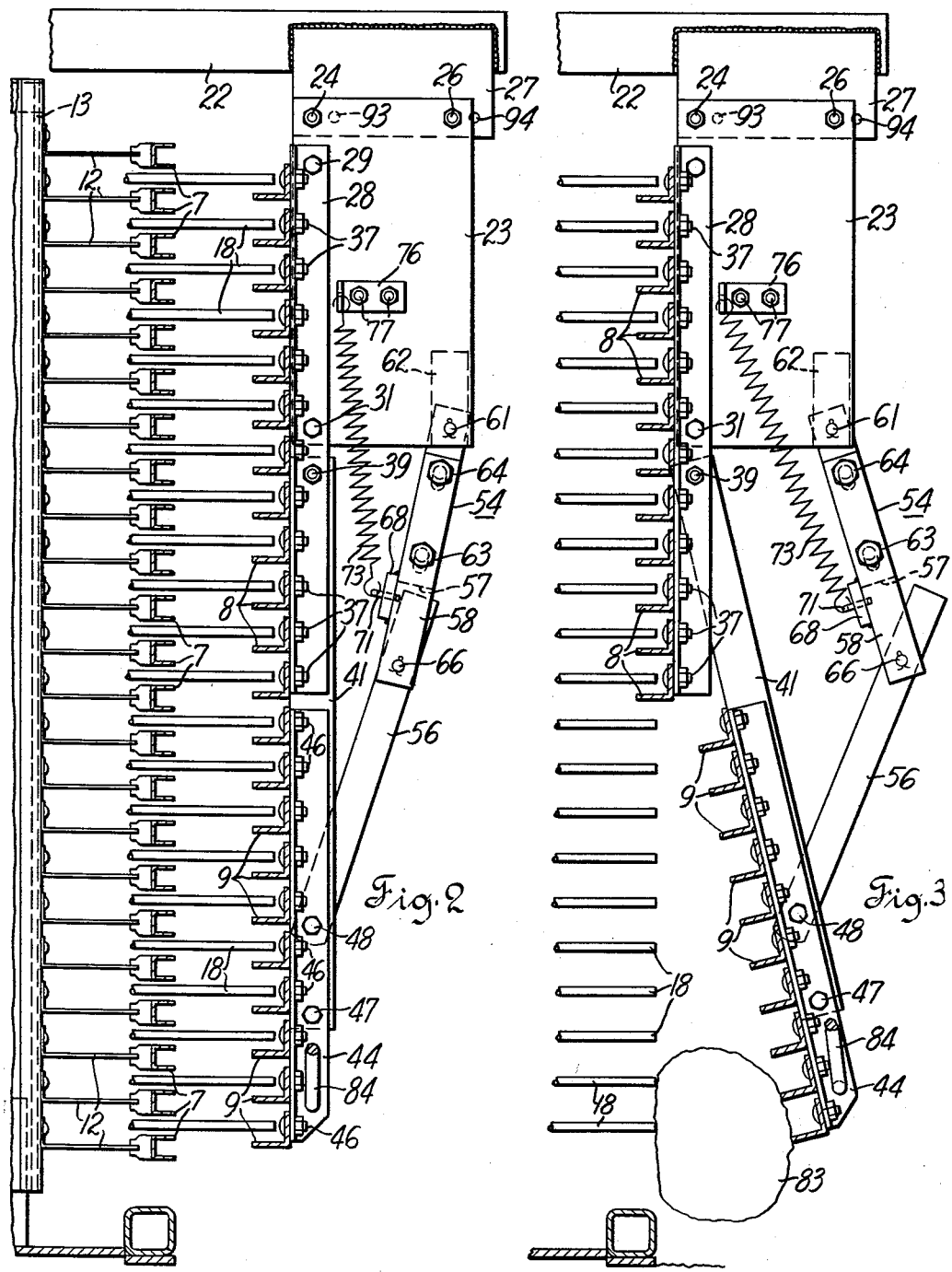
Inventor
Percy A. Keith
by [signature]
Attorney

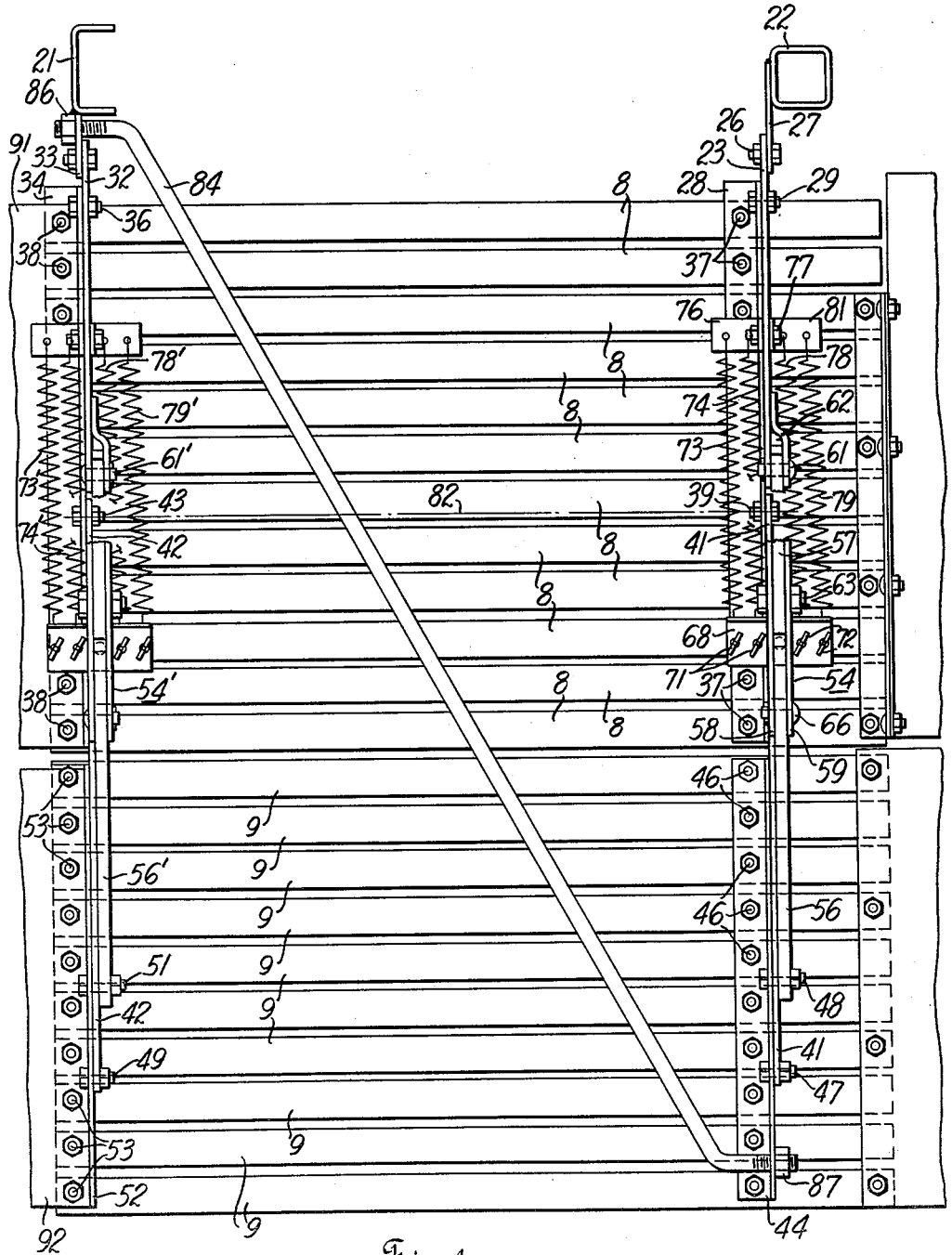

United States Patent Office 3,082,590
Patented Mar. 26, 1963

3,082,590
COTTON HARVESTER
Percy A. Keith, Pine Bluff, Ark., assignor to Allis-Chalmers Manufacturing Company, Milwaukee, Wis.
Filed Feb. 6, 1961, Ser. No. 87,327
10 Claims. (Cl. 56—42)

The invention relates to cotton harvesting machines, and it is concerned more particularly with a device which will protect such machines against damage when a rock or similar obstruction which might be encountered in the field, should accidentally enter the picking unit.

Machines for picking cotton by means of rotary spindles are usually provided with a picking tunnel through which the cotton plants move while the machine advances over the field. Before the cotton plants enter the picking tunnel they are gathered and pressed together from opposite sides by a pair of gathering shields or plant dividers which are mounted ahead of the picking tunnel. During the subsequent movement of the laterally compacted plants through the picking tunnel the rotating picking spindles are thrust into and withdrawn from the picking tunnel in order to remove the fibers of the ripe cotton bolls from the mass of compacted plant material.

The lower portions of the dividers ride close to the ground so that they may pick up low branches of the plants and guide them into the picking tunnel. If a stone, a hard lump of clayey soil or other solid object lying on the ground should be straddled by the dividers they might pick it up and feed it, along with the cotton plants, into the picking tunnel. It may then happen that one or more of the rotating picking spindles which are thrust laterally into the compressed cotton plants hit the stone or other obstruction which is lodged within the compressed mass of plant material, and as a result, the spindles and other parts of the machine may become damaged. Also, a rock or similar obstruction which is too large to enter the picking tunnel may cause jamming of the picking mechanism and damage to its parts including the picking spindles.

Generally, it is an object of the invention to take care of the hereinbefore mentioned difficulties in a practical and entirely satisfactory manner.

More specifically, it is an object of the invention to provide an improved picking unit for cotton harvesters which will permit automatic widening of the picking tunnel when a picking spindle pushes against a solid obstruction such as a stone in the picking tunnel, or when a stone which is wider than the picking tunnel is straddled by the dividers and moved together with the plant material into the picking tunnel.

A further object of the invention is to provide an improved picking unit of the above mentioned character wherein widening of the picking tunnel due to the mentioned or other causes will be opposed with progressively decreasing resistance. That is, the widening of the tunnel will be opposed initially by a relatively strong force, but once the initial opposing force is overcome, a lesser force will suffice to progressively increase the effective width of the tunnel.

A still further object of the invention is to provide an improved picking mechanism wherein only the lower part of the tunnel is permitted to widen; that is, the part of the tunnel into which stones or similar obstructions are likely to be moved together with the plant material.

A still further object of the invention is to provide an improved picking unit of the type incorporating a swingable stalk crowder structure for compressing the cotton plants laterally, and picking spindles of the cylindrical rod type such as shown, for instance in United States Patent 2,671,298 issued on March 9, 1954, to R. C. Fergason, or in United States Patent 2,943,431 issued on July 5, 1960, to J. H. Gray et al., and wherein the crowder structure yields with decreasing resistance to thrust transmitted to it from the spindles through a rock or other solid object lodged in the laterally compressed plant material.

These and other objects and advantages of the invention are attained by the present invention, various novel features of which will be apparent from the description herein and the accompanying drawings disclosing an embodiment of the invention, and will be more particularly pointed out in the appended claims.

In the drawings:

FIG. 2 is an enlarged end elevation, in section, on line II—II of FIG. 1, of part of the picking unit shown in FIG. 1;

FIG. 3 is a sectional end elevation similar to FIG. 2, omitting structure shown at the left of FIG. 2 and showing parts at the right in a tunnel widening condition;

FIG. 4 is a side elevation of a stalk crowder structure incorporated in the unit shown in FIG. 2.

Figure 1:
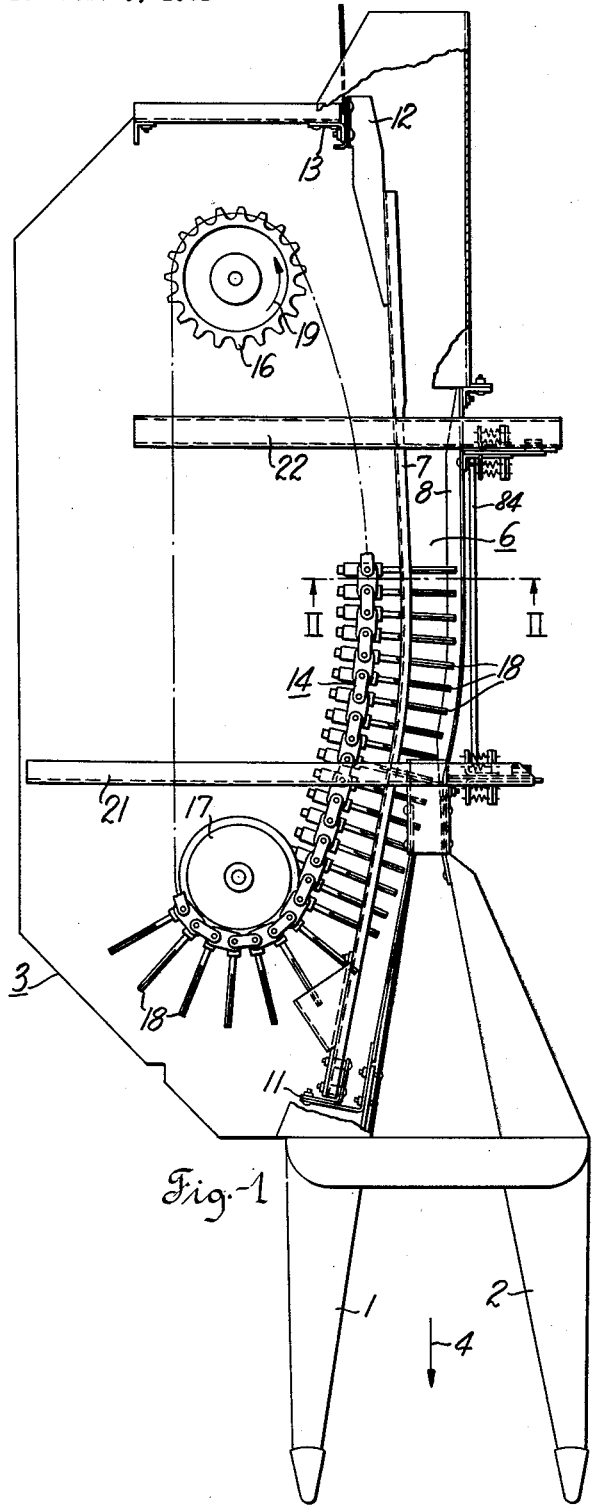
FIG. 1 is a partly schematic top view of a picking unit for a cotton harvester, parts of the unit being broken away and shown in section.

The picking unit shown in FIG. 1 is of the well known type which has a pair of tapered plant dividers 1 and 2 at its forward end, and a frame structure 3 which is shown in general outline and on which the dividers 1 and 2 are mounted in rearwardly converging relation to each other. The entire picking unit is conventionally mounted on a self-propelled supporting vehicle (not shown), and a row of cotton plants (not shown) may be straddled by the dividers 1 and 2 as the machine advances over the field in the direction of arrow 4. A picking tunnel 6 extends rearwardly from the narrow end of the rearwardly tapering space between the dividers 1 and 2, and is defined by a stack of twenty-three vertically spaced stalk guide beams 7 (FIG. 2) at one side of the tunnel, and by an upper stack of twelve stalk crowder beams 8 and a lower stack of ten stalk crowder beams 9 at the other side of the tunnel.

The guide beams 7 are of conventional shape and are secured at their forward ends to an upright angle beam post 11 (FIG. 1) which is an integral part of the frame structure 3. At their rear ends the talk guide beams 7 terminate in horizontal plate 12 which are secured to an upright angle post 13. The angle post 13, like the angle post 9, forms an integral part of the frame structure 1.

An endless slat belt 14 of conventional construction is mounted on the frame structure 3 for travel in a horizontal oblong path around a rear drive sprocket 16 and a front idler 17. The slat belt 14 comprises a series of pivotally interconnected vertical slats on which rotary picking spindles 18 are mounted in conventional manner. That is, each slat carries a vertical row of picking spindles 18 which project outwardly from the slat belt and move through the picking tunnel 6 from front to rear when the sprocket wheel 16 is driven in the direction of arrow 19. In FIG. 2 the outer ends of one vertical row of picking spindles 18 are shown in relation to the stalk guide beams 7 and stalk crowder beams 8 and 9. The stalk guide beams 7 are rigidly interconnected in vertically spaced relation to each other and provide a horizontal stalk guide structure at one side of the picking tunnel 6. The vertical spaces between the stalk guide beams 7 provide horizontal slots through which the picking spindles 18 are admitted into the picking tunnel. The stalk crowder beams 8 and 9 are mounted and arranged, as more fully explained hereinbelow, to provide a stationary upper and a swingable lower section of a stalk crowder structure which defines the other side of the picking tunnel 6. The picking spindles are rotated on their axes during their horizontal travel through the picking tunnel by means of a suitable mechanism, not shown, of conventional construction. For a fuller disclosure of the slat belt, the spindle mounting, and the spindle drive mechanism reference may be had to United States Patent 2,671,298, issued on March 9, 1954, to R. C. Fergason for Cotton Picker.

The frame structure 3 includes an upper front cross beam 21 and an upper rear cross beam 22, both projecting beyond the picking tunnel 6 at one side of the picking unit. An upper rear bracket member 23 (FIG. 2) is secured by bolts 24 and 26 to a mounting plate 27 which is rigidly secured as by welding to the outer end of the rear cross beam 22. As shown in FIGS. 2 and 4, an angle iron beam 28 is secured to the front face of the rear bracket plate 23 by bolts 29 and 31, the lower portion of the angle iron beam 28 extending a substantial distance downward beyond the lower edge of the bracket plate 23.

A front bracket plate 32 which is a duplicate of the rear bracket plate 23 is similarly secured to the front cross beam 21 of the frame structure 3 by means of a mounting plate 33 (FIG. 4) which is secured as by welding to the underside of the front cross beam 21. An angle iron beam 34 corresponding to the angle iron beam 28 is secured to the front face of the bracket plate 32 by an upper bolt 36 and a corresponding lower bolt (not shown) near the lower edge of the bracket plate 32. As shown in FIG. 2, the upper crowder beams 8 are L-shaped in cross section and secured to the forwardly projecting leg of the angle iron beam 28 by means of bolts 37. The forward ends of the crowder beams 8 are similarly secured to the angle iron beam 34 by means of bolts 38 as indicated in FIG. 4.

Pivotally connected to the outwardly projecting flange of the rear angle iron beam 28 by means of a bolt 39 (FIG. 2) is a rear supporting arm 41 for the lower stalk crowder section comprising the beams 9. A similar supporting arm 42 for the lower stalk crowder section is pivotally connected by means of a bolt 43 to the outwardly projecting flange of the angle iron beam 34. The lower crowder beams 9 are secured together at their rear ends by an angle iron beam 44 and a series of bolts 46 which extend through the beam 44 and adjacent legs of the L-shaped lower crowder beams 9 in order to maintain the crowder beams 9 at their rear ends in vertically spaced relation to each other.

The lower end of the rear crowder beam supporting arm 41 is rigidly secured to the angle iron beam 44 by a lower bolt 47 and an upper bolt 48. The lower end of the forward crowder beam supporting arm 42 (FIG. 4) is similarly secured by means of a lower bolt 49 and an upper bolt 51 to an angle iron beam 52 which is connected by bolts 53 to the vertically spaced forward ends of the crowder beams 9.

A pair of pivotally interconnected toggle links 54 and 56 (FIG. 2) are operatively interposed in load transmitting relation between the upper rear bracket plate 23 and the lower end section of the stalk crowder structure comprising the horizontal beams 9 and vertical beams 44 and 52. The upper toggle link 54 comprises a center strap 57 and two side straps 58 and 59 (FIG. 4) at opposite sides of the center strap. The upper ends of the side straps 58 and 59 terminate below the upper end of the center strap 57 and a pivot pin 61 connects the upper end of the center strap to the bracket plate 23. The pin 61 extends through aligned holes in the bracket plate 23, center strap 57 and an offset clip 62 which is welded to the rear face of the bracket plate 23 and overlaps the center strap 57. The pin 61 has a head at one end and is secured against axial displacement by a cotter pin in its other end.

The side straps 58 and 59 of the upper toggle link 54 extend beyond the lower end of the center strap 57 and form a forked end which straddles the upper end of the lower toggle link 56. A pair of bolts 63 and 64 (FIG. 2) are inserted through the center and side straps of the upper toggle link 54 for securing the side straps to the center strap. The holes in the center strap which receive the bolts 63 and 64 are elongated in order to provide for limited length adjustment of the upper toggle link 54.

The adjoining ends of the upper and lower toggle links 54 and 56 are pivotally interconnected by a pin 66 which extends through aligned holes in the side straps 58 and 59 of the upper link and in the upper part of the lower link 56. The pin 66 has a head at one end and is secured against axial displacement by a cotter pin in its other end. The lower end of the toggle link 56 is pivotally secured to the swingable stalk crowder structure comprising the crowder beams 9 and angle beams 44 and 52 by means of the bolt 48 which, as mentioned, passes through the outwardly projecting flange of the angle beam 44 and through the crowder supporting arm 41. A nut on the rearwardly projecting portion of the bolt 48 is adjusted to and locked in a position which provides free swinging movement of the lower toggle link 56 about the axis of the bolt 48.

Figure 5:
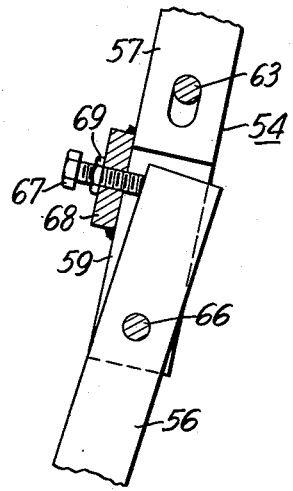
FIG. 5 is an enlarged detail view of a toggle joint shown in FIGS. 2 and 3, parts in FIG. 5 being broken away and shown in section.

FIG. 2 shows the toggle links 54 and 56 in a near dead center position which is determined by a set screw 67 (FIG. 5) on the upper link 54. The set screw 67 extends through a threaded hole in a cross plate 68 which is secured as by welding to the side of the upper link 54 which faces the crowder structure. The upper end of the lower link 56 is engageable with the outer end of the set screw 67. A jam nut 69 on the set screw 67 is drawn up against the cross plate 68 in order to secure the set screw 67 in adjusted position.

As shown in FIG. 4, the cross plate 68 extends forwardly and rearwardly beyond the side straps 58, 59, respectively, of the upper link 54. A pair of cotter pins 71 is mounted in the forward portion of the cross plate 68 and another pair of cotter pins 72 is mounted in the rearward portion of the cross plate 68. A pair of coil springs 73 and 74 are hooked at their lower ends into the eyes of the cotter pins 71, and the upper ends of the coil springs 73 and 74 are hooked into a bracket clip 76 which is secured by bolts 77 (FIG. 2) to the forward side of the bracket plate 23. Another pair of coil springs 78 and 79 are hooked at their lower ends into the eyes of the cotter pins 72, and the upper ends of the coil springs 78 and 79 are hooked into a bracket clip 81 (FIG. 4) which is secured to the rear side of the bracket plate 23 by the bolts 77.

In the condition of the mechanism as shown in FIG. 2, the coil springs 73, 74 and 78, 79 are in a state of initial extension so as to urge the toggle links 54 and 56 into the near dead center position which is determined by engagement of the upper end of the lower link 56 with the outer end of the set screw 67. Swinging movement of the crowder supporting arm 41 about the pivot bolt 39 will, therefore, be strongly resisted by the bracing action of the nearly aligned toggle links 54 and 56 and by the strong biasing action of the four coil springs 73, 74 and 78, 79.

A spring loaded toggle mechanism which is identical with the spring loaded toggle mechanism shown in FIG. 2 is operatively interposed in load transmitting relation between the forward bracket plate 32 on the frame structure 3 of the unit and the forward crowder supporting arm 42. The upper and lower links of the forward toggle mechanism are designated by the reference characters 54' and 56', respectively, and the pivotal connections of the upper and lower toggle links with the bracket plate 32 and with the forward crowder supporting arm 42 are afforded by a pivot pin 61' and by the bolt 51 which extends through the outer flange of the angle iron beam 52, the supporting arm 42 and through a hole in the lower end of the toggle link 56'. Coil springs 73', 74' and 78', 79' are connected with the upper toggle link 54' and with the bracket plate 32 in the same manner as has been explained hereinbefore in connection with the toggle link 54. Like the coil springs of the rear toggle mechanism, the coil springs of the front toggle mechanism are operative to urge the toggle links 54' and 56' into a near dead center position corresponding to the near dead center position of the rear toggle links 54 and 56 shown in FIG. 2.

When the front and rear toggle mechanisms are in their near dead center positions they determine a normal operative position of the lower part of the stalk crowder structure which comprises the crowder beams 9 and angle iron beams 44 and 52. As shown in FIG. 2, the spacings between the stalk guide beams 7 and the lower stalk crowder beams 9 are the same as the spacings between the stalk guide beams 7 and the upper stalk crowder beams 8 when the swingable lower part of the stalk crowder structure is in its normal operative position as shown in FIG. 2.

The bolt 39 (FIG. 2) which connects the rearward stalk supporting arm 41 with the angle beam 28, and the bolt 43 (FIG. 4) which connects the forward crowder supporting arm 42 with the angle beam 34, are aligned on a horizontal axis which is indicated by the dash-dotted line 82. In the condition of the mechanism as shown in FIG. 2, swinging movement of the lower part of the crowder structure about the axis 82 in tunnel widening direction is strongly resisted by the bracing action of the nearly aligned rear toggle links 54 and 56, the biasing action of the associated coil springs 73, 74 and 78, 79 and by the bracing action of the nearly aligned front toggle links 54', 56' and the biasing action of the associated coil springs 73', 74' and 78', 79'.

When the machine is operated in the field, the dividers 1 and 2 move along opposite sides of a row of cotton plants and the plants are thereby gathered and laterally compressed to the normal width of the picking tunnel 6. This normal width, as stated, is the lateral distance of the upper and lower crowder beams 8 and 9 from the stalk guide beams 7 as shown in FIG. 2. If a stone or other solid object lying in the field should be picked up by the dividers and forced to enter the picking tunnel, the lower part of the crowder structure which comprises the crowder beams 9 and connecting beam 44 and 52 may swing in a tunnel widening direction about the axis 82 from the normal position shown in FIG. 2 to the tunnel widening position shown in FIG. 3. Such swinging movement of the swingable crowder section will not only accommodate entry of the obstruction, such as 83 in FIG. 3, into the picking tunnel, but it will also accommodate rearward movement of the obstruction through the picking tunnel while the machine moves forward over the field. If one or more of the lower spindles 18 should be thrust against the obstruction 83 in the direction of their axes, as shown in FIG. 3, considerable pressure will develop which tends to break the forward and rearward toggle links 54, 56 and 54', 56' away from their near dead center positions and thereby release the lower crowder structure for swinging movement in a tunnel widening direction.

Depending on the relative initial angle between the upper and lower toggle links and upon the initial tension of the associated coil springs, the required amount of pressure which must be exerted against the lower crowder structure in order to dislodge it from its normal position will be more or less powerful. The near dead center positions of the toggle links and the initial spring tensions are so adjusted that the lower crowder structure will yield under a pressure less than that which might damage the picking spindles. It will be noted that once an outward pressure against the swingable crowder structure has been developed which starts its movement in tunnel widening direction, the resistance against tunnel widening movement of the swingable crowder structure thereafter rapidly decreases as the crowder structure swings away from its normal operating position in which it is shown in FIG. 2. As a result, the spindles will be quickly relieved of the relatively heavy thrust to which they become momentarily subjected in order to start movement of the swingable crowder structure in tunnel widening direction. The obstruction such as the stone 83 in FIG. 3 may not drop out of the picking tunnel immediately when the stalk crowder structure swings outward, and it may be carried with the spindles through the entire length of the picking tunnel. When the plants then emerge from the rear end of the picking tunnel the stone or any other obstruction which has passed through the picking tunnel will then be free to drop to the ground.

As soon as the picking tunnel has been cleared of the obstruction the swingable crowder structure will automatically return to the normal position in which it is shown in FIG. 2 by operation of the front and rear toggle mechanisms and their associated tension springs.

In general terms, the toggle mechanisms 54, 56 and 54', 56' and their associated tension springs represent collapsible bracing means which are operatively interposed between the stalk guide and crowder structures and which are operative to yieldingly oppose tunnel widening swinging movement of the crowder structure with progressively decreasing resistance. Either of the pins 61, 61' represents first pivot means which are mounted in a fixed position on the frame structure 3 and connect one of the toggle links therewith for swinging movement at a first pivot center which is spaced a predetermined distance from the horizontal pivot axis 82. Either of the pivot bolts 48 and 51 represents second pivot means which are mounted on the swingable crowder structure for swinging movement therewith about the horizontal pivot axis 82 and which connect the other of the toggle links with the crowder structure at a second pivot center which is spaced a predetermined distance from said horizontal axis. The set screw 67 and cooperating upper part of the lower toggle link 56 represent stop means for determining a near dead center position of the toggle links.

In the illustrated embodiment of the invention the toggle links 54, 56 extend in general end to end relation between the associated bracket member 23 on the frame structure and a lower part of the associated crowder supporting arm 41 when they occupy their near dead center position. The predetermined distances of the horizontal axis 82, and the spacings of the pivot connection 66 between the toggle links, from the first and second pivot centers 61 and 48, respectively, of the rear bracing means are such that said toggle links, when in their near dead center positions, extend in general end to end relation between said first and second pivot centers. These explanations analogously apply to the front bracing means including the toggle links 54', 56'.

Referring again to FIG. 4, a diagonal brace rod 84 is swingably connected at its upper end with the mounting plate 33 on the front cross beam 21 of the frame structure, and the rearward lower end of the diagonal brace rod 84 is pivotally connected with the lower end of the angle beam 44 of the swingable crowder structure. The ends of the brace rod 84 are angled so as to extend horizontally through plain holes in the mounting plate 33 and in the outwardly projecting flange of the angle beam 44, respectively. Sliding movement of the brace rod 84 within the holes of the plate 33 and angle beam 44 during swinging movement of the lower stalk crowder structure is limited by a nut 86 on the threaded upper end of the brace rod 84 and by a nut 87 on the threaded lower end of the brace rod 84.

The forward ends of the stationary crowder bars 8, as shown in FIG. 4, are covered by and connected with the rear portion of a sheet metal wall 91 which forms a rearward upper part of the divider 2. Similarly, the forward ends of the swingable crowder bars 9 are covered by the rear portion of a sheet metal wall 92 which forms a rearward lower part of the divider 2. The rear portion of the wall 92 bears slidably face to face against the crowder bars 9 and the wall 92 is swingably connected with a forward portion of the divider 2 so that it may follow the lower crowder structure during swinging movement of the latter about the axis 82.

The bracket plates 23 and 32 and all of the mechanism carried thereby may be adjusted relative to the beams 22 and 21, respectively, in order to increase the width of the picking tunnel, if desired. For that purpose an extra pair of holes 93 and 94 (FIG. 2) is provided in the rear mounting plate 27, and a corresponding extra pair of holes, not shown, is provided in the front mounting plate 33. Removal of the rear mounting bolts 24, 26 and of the corresponding front mounting bolts releases the entire crowder structure together with the front and rear toggle mechanisms for outward adjustment on the frame beams 21, 22 in tunnel widening direction. By installing the front and rear mounting bolts in the respective extra pairs of holes, the crowder structure may be secured in the readjusted, tunnel widened position.

While in the foregoing a preferred embodiment of the invention has been shown and described, it should be understood that it is not intended to limit the invention to the illustrated details of construction but that the invention includes such other forms and modifications as are embraced by the scope of the appended claims.

What is claimed is:

1. In a picking unit for cotton harvesters, the combination of a stationary stalk guide structure and a swingable stalk crowder structure defining opposite side portions, respectively, of a picking tunnel, and collapsible bracing means operatively interposed between said stalk guide and crowder structures and operative to yieldingly oppose tunnel widening swinging movement of said crowder structure with progressively decreasing resistance.

2. In a picking unit for cotton harvesters, the combination of a stationary stalk guide structure and a swingable stalk crowder structure defining opposite side portions, respectively, of a picking tunnel, and spring loaded toggle means operatively interposed between said stalk guide and crowder structures and operative to yieldingly oppose tunnel widening swinging movement of said crowder structure with progressively decreasing resistance.

3. In a picking unit for cotton harvesters, the combination of a frame structure; a horizontal stalk guide structure operatively mounted on said frame structure; a stalk crowder structure; pivot means operatively mounting said stalk crowder structure on said frame structure for swinging movement into and out of a predetermined operative position opposite to said stalk guide structure; and yieldable bracing means operatively connected with said stalk crowder structure for releasably securing the latter against swinging movement from said predetermined operative position in a direction away from said stalk guide structure, said bracing means comprising at least one pair of pivotally interconnected toggle links having pivot centers, respectively, on said frame and crowder structures and operative to determine said operative position of said crowder structure by movement of said toggle links into a near dead center position; stop means determining said near dead center position of said toggle links; and spring means operative to urge said toggle links into said near dead center position.

4. The combination set forth in claim 3, wherein said spring means for urging said toggle links into said near dead center position are operatively connected in load transmitting relation with said frame structure.

5. In a picking unit for cotton harvesters, the combination of a frame structure; a stalk crowder structure pivotally suspended at front and rear portions thereof from said frame structure for swinging movement about a horizontal axis, and yieldable front and rear bracing means operatively connected with said crowder structure, each of said bracing means comprising a pair of pivotally interconnected toggle links, first pivot means mounted in a fixed position on said frame structure and connecting one of said links therewith for swinging movement at a first pivot center spaced a predetermined distance from said horizontal axis, second pivot means mounted on said crowder structure for swinging movement therewith about said horizontal axis and connecting the other of said links with said crowder structure at a second pivot center spaced a predetermined distance from said horizontal axis; stop means operatively associated with said links for determining a near dead center position thereof; and extensible and contractible spring means operatively interposed in load transmitting relation between said frame and crowder structures by means of said toggle links and operative to urge the latter into said near dead center position.

6. The combination set forth in claim 5, wherein the predetermined distances of said horizontal axis, and the spacings of the pivot connection between said toggle links, from said first and second pivot centers, respectively, of each of said front and rear bracing means, are such that said toggle links, when in said near dead center position, extend in general end to end relation between said first and second pivot centers.

7. In a picking unit for cotton harvesters, the combination of a frame structure including a pair of upper front and rear bracket members, a stalk crowder structure having front and rear supporting arms pivotally connected at upper end portions thereof with said front and rear bracket members, respectively, for swinging movement about a horizontal axis; and yieldable front and rear bracing means associated, respectively, with said front and rear crowder supporting arms; each of said bracing means comprising a pair of pivotally interconnected toggle links operatively interposed in load transmitting relation between the respective bracket member and supporting arm and movable into a near dead center position in which said toggle links extend in general end to end relation between the associated bracket member and a lower part of the associated crowder supporting arm; stop means operatively associated with said toggle links for determining said near dead center position of said toggle links; and extensible and contractible spring means operatively interposed in load transmitting relation between the associated bracket member and supporting arm by means of said toggle links and operative to urge the latter into said near dead center position.

8. The combination set forth in claim 7 including fixed mounting elements for said spring means secured to said front and rear brackets, respectively; and swingable mounting elements for said spring means, one of said swingable spring mounting elements being secured to one of the toggle links of said front bracing means, and another of said spring mounting elements being secured to one of the toggle links of said rear bracing means.

9. In a picking unit for cotton harvesters, the combination of a frame structure, a stationary stalk guide structure mounted on said frame structure and defining a vertical, horizontally slotted first side wall of a picking tunnel, an upper stalk crowder structure mounted on said frame structure at a fixed transverse spacing from said stalk guide structure and defining an upper part of a second side wall of said picking tunnel opposite to said first side wall, a lower stalk crowder structure mounted on said frame structure for transverse back and forth movement relative to said stalk guide structure and defining a lower part of said second side wall of said picking tunnel; and collapsible bracing means operatively connected with said crowder structure and operative to yieldingly oppose tunnel widening swinging movement of said lower stalk crowder structure with progressively decreasing resistance.

10. In a picking unit for cotton harvesters, the combination of a frame structure, a stalk crowder structure swingably mounted on said frame structure and defining a side portion of a picking tunnel, and collapsible bracing means operatively interposed between said frame and stalk crowder structures and operative to yieldingly oppose tunnel widening swinging movement of said crowder structure with progressively decreasing resistance.

References Cited in the file of this patent

UNITED STATES PATENTS

| | | |
|---|---|---|
| 2,671,298 | Fergason | Mar. 9, 1954 |
| 2,830,427 | Odom | Apr. 15, 1958 |
| 2,904,948 | Hubbard | Sept. 22, 1959 |